United States Patent
Byron et al.

(10) Patent No.: US 10,380,533 B2
(45) Date of Patent: Aug. 13, 2019

(54) BUSINESS PROCESS MODELING USING A QUESTION AND ANSWER SYSTEM

(71) Applicant: International Business Machines Corporation, Armonk, NY (US)

(72) Inventors: Donna K. Byron, Petersham, MA (US); Lakshminarayanan Krishnamurthy, Round Rock, TX (US); Alexander Pikovsky, Laxington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1018 days.

(21) Appl. No.: 14/103,478

(22) Filed: Dec. 11, 2013

(65) Prior Publication Data

US 2015/0161532 A1 Jun. 11, 2015

(51) Int. Cl.
*G06Q 10/06* (2012.01)

(52) U.S. Cl.
CPC .................................. *G06Q 10/067* (2013.01)

(58) Field of Classification Search
CPC ........ G06Q 10/06; G06Q 40/00; G06Q 30/04; G06Q 10/10; G06Q 40/123; G06Q 99/00; G06Q 10/0637; G06Q 10/0639; G06Q 10/087; G06Q 30/0601; G06Q 50/01; G06Q 10/063112; G06Q 10/101; G06Q 10/20; G06Q 10/067; G06Q 10/00; G06Q 10/0633; G06Q 10/04; G06Q 10/103; G06Q 10/063; G06Q 10/0631; G06Q 10/06375; G06Q 30/0256

USPC ............ 705/348, 7.11, 7.12; 704/9; 707/723
See application file for complete search history.

(56) References Cited

U.S. PATENT DOCUMENTS

| | | | |
|---|---|---|---|
| 8,275,644 B2 | 9/2012 | Cases et al. | |
| 8,296,117 B2 | 10/2012 | Narayanaswamy et al. | |
| 8,296,170 B2 | 10/2012 | O'Brien et al. | |
| 8,321,251 B2 | 11/2012 | Opalach et al. | |
| 8,321,841 B2 | 11/2012 | Leung | |
| 8,468,491 B2 | 6/2013 | Markovic | |
| 9,092,802 B1* | 7/2015 | Akella ............... | G06Q 30/0256 |
| 2009/0037237 A1* | 2/2009 | Weber .................... | G06Q 10/06 705/7.11 |
| 2010/0031240 A1* | 2/2010 | Drumm ............. | G06F 17/30864 717/143 |
| 2010/0070517 A1* | 3/2010 | Ghosh ................... | G06F 16/367 707/758 |

(Continued)

*Primary Examiner* — Jamie H Austin
(74) *Attorney, Agent, or Firm* — Garg Law Firm, PLLC; Rakesh Garg; Reza Sarbakhsh (57) ABSTRACT

A method, system, and computer program product for creating or augmenting a business process model using a question and answer (Q and A) system are provided in the illustrative embodiments. A request to create the business process model of a business process is received. A knowledgebase is created using a business process modeling (BPM) data and user domain data. The user domain data comprises a combination of unstructured documents and structured documents related to an operation in a user domain. A natural language (NL) question is formed corresponding to the request. The NL question and the knowledgebase are submitted to the Q and A system. A set of answers is received from the Q and A system responsive to the NL question. An answer is presented as a part of the business process model.

14 Claims, 5 Drawing Sheets

(56) References Cited

U.S. PATENT DOCUMENTS

| | | | |
|---|---|---|---|
| 2011/0029947 A1* | 2/2011 | Markovic | G06Q 10/10 |
| | | | 717/102 |
| 2012/0116987 A1 | 5/2012 | Hering et al. | |
| 2012/0284316 A1 | 11/2012 | Klinker et al. | |
| 2013/0035931 A1* | 2/2013 | Ferrucci | G06F 16/90332 |
| | | | 704/9 |
| 2013/0066886 A1* | 3/2013 | Bagchi | G06F 17/30654 |
| | | | 707/749 |
| 2013/0159896 A1* | 6/2013 | Mayerle | G06Q 10/06375 |
| | | | 715/765 |
| 2013/0262501 A1* | 10/2013 | Kuchmann-Beauger | |
| | | | G06F 16/24535 |
| | | | 707/769 |

* cited by examiner

BUSINESS PROCESS MODELING USING A QUESTION AND ANSWER SYSTEM

BACKGROUND

1. Technical Field

The present invention relates generally to a method, system, and computer program product for modeling business processes. More particularly, the present invention relates to a method, system, and computer program product for business process modeling using a question and answer system.

2. Description of the Related Art

Business Process Modeling (BPM) defines a business process (BP), where the process flow contains multiple activities and sub-processes. An example of a business process is a process for making loans. A task or a sub-process within the loan-making business process is the process of performing credit verification of the loan Applicant.

Most organizations have specialized domain experts or business analysts who are well-versed and responsible for modeling the business processes in the operating environment, or domain, of the organization. Because of their domain expertise, such individuals are able to model standard tasks, such as how to perform credit verification in the organization's loan approval process.

Modeling business processes is often a manual task of creating a business process flow by defining the tasks that participate in the business process, labeling the tasks, and ordering the labeled tasks in some desired order to accomplish the business process according to the organization's needs.

A BPM tool is a software application, which accepts the business process flow as defined, labeled and ordered by the analyst and outputs a model of the business process in a business process modeling language. The model in the modeling language is then usable for implementing the business process in a workflow using one or more data processing systems and applications.

Natural language processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form.

A question and answer system (Q and A system) is an artificial intelligence application executing on data processing hardware. A Q and A system answers questions pertaining to a given subject-matter domain presented in natural language.

Typically, a Q and A system is provided access to a collection of information, forming a knowledgebase, based on which the Q and A system answers questions pertaining to that domain. For example, a Q and A system accesses a body of knowledge about the domain, where the body of knowledge (knowledgebase) can be organized in a variety of configurations. For example, a knowledgebase of a domain can include structured repository of domain-specific information, such as ontologies, or unstructured data related to the domain, or a collection of natural language documents about the domain.

SUMMARY

The illustrative embodiments provide a method, system, and computer program product for business process modeling using a question and answer system. An embodiment includes a method for creating a business process model using a question and answer (Q and A) system, the method comprising. The embodiment receives a request to create the business process model of a business process. The embodiment creates a knowledgebase using a business process modeling (BPM) data and user domain data, wherein the user domain data comprises a combination of unstructured documents and structured documents related to an operation in a user domain. The embodiment forms, using a processor and a memory, a natural language (NL) question corresponding to the request. The embodiment submits the NL question and the knowledgebase to the Q and A system. The embodiment receives a set of answers from the Q and A system responsive to the NL question. The embodiment presents an answer as a part of the business process model.

Another embodiment includes a computer usable program product comprising a computer usable storage device including computer usable code for creating a business process model using a question and answer (Q and A) system. The embodiment further includes computer usable code for receiving a request to create the business process model of a business process. The embodiment further includes computer usable code for creating a knowledgebase using a business process modeling (BPM) data and user domain data, wherein the user domain data comprises a combination of unstructured documents and structured documents related to an operation in a user domain. The embodiment further includes computer usable code for forming, using a processor and a memory, a natural language (NL) question corresponding to the request. The embodiment further includes computer usable code for submitting the NL question and the knowledgebase to the Q and A system. The embodiment further includes computer usable code for receiving a set of answers from the Q and A system responsive to the NL question. The embodiment further includes computer usable code for presenting an answer as a part of the business process model.

Another embodiment includes a data processing system for creating a business process model using a question and answer (Q and A) system. The embodiment further includes a storage device including a storage medium, wherein the storage device stores computer usable program code. The embodiment further includes a processor, wherein the processor executes the computer usable program code. The embodiment further includes computer usable code for receiving a request to create the business process model of a business process. The embodiment further includes computer usable code for creating a knowledgebase using a business process modeling (BPM) data and user domain data, wherein the user domain data comprises a combination of unstructured documents and structured documents related to an operation in a user domain. The embodiment further includes computer usable code for forming, using a processor and a memory, a natural language (NL) question corresponding to the request. The embodiment further includes computer usable code for submitting the NL question and the knowledgebase to the Q and A system. The embodiment further includes computer usable code for receiving a set of answers from the Q and A system responsive to the NL question. The embodiment further includes computer usable code for presenting an answer as a part of the business process model.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that the information necessary for defining business processes within an organization can come in a variety of forms and formats. While some standard process definitions are packaged with some BPM tools that the organization might use, in a significant number of organizations, the standard definitions are not directly usable.

For example, while a standard loan-making process may include the task of credit verification, an organization might skip the task for certain customers, require a specific type of verification using specific agencies, or use the task at a different point in the loan process. For example, the standard loan business process may verify the credit upon receiving a loan application whereas an organization may verify credit only for amounts exceeding some limit, for new customers only, upon pre-approval, from XYZ agency using XYZ agency's verification process, or a combination thereof.

Accordingly, the illustrative embodiments recognize that the standard BPs and the documentation of the BPM tool (collectively, BPM data) are often insufficient to implement an organization-specific BP. The illustrative embodiments recognize that organization-specific documents (collectively, user domain data) play an important role in defining and modeling Bps for a given organization.

The illustrative embodiments further recognize that the user domain data can be present in the organization in not only numerous forms but also in numerous contexts. For example, some user domain data may be available in the form of text documents, graphs, presentations, spreadsheets, rules and policies logic, and many other forms of presenting data. Furthermore, such varied forms of user domain data might be available in different parts or systems of the organization in different contexts. For example, user domain data can exist in the contextual form of requirement documents, email and other communications, product manuals and documentation, system specifications, regulations and governance documents, and many other forms in other contexts.

The illustrative embodiments further recognize that when modeling a process, the task of determining the next step in a process is still an art form that is heavily dependent upon an individual's skills and knowledge. The illustrative embodiments also recognize that presently, because of the individualized manner of manual process flow construction, BPM is often a time consuming process.

Furthermore, the illustrative embodiments recognize that the extensive involvement of individuals in BPM also promotes inconsistencies, such as when different individuals model different processes that may involve the same type of activities. For example, "Acquire credit score" and "Perform credit verification" semantically mean the same concept, but different business experts may model the concept in different ways while modeling different processes.

The illustrative embodiments used to describe the invention generally address and solve the above-described problems and other problems related to business process modeling. The illustrative embodiments provide a method, system, and computer program product for business process modeling using a Q and A system.

The illustrative embodiments use a Q and A system in combination with a BPM tool to make business process modeling consistent from process to process within an organization while addressing organization-specific BP requirements. An embodiment constructs a knowledgebase for the Q and A system by collecting not only the BPM tool-provided standard model information and documentation but also user domain data in all available forms and contexts.

In one embodiment, the application processes an unstructured document, a structured document, or a combination thereof, so that the processed document(s) are suitable for use with a Q and A system. For example, in one embodiment, the application converts a document in the user domain data into a natural language form that is usable in a Q and A system for answering natural language questions.

The Q and A system detects relationships, descriptions, labels, and other process elements from the knowledgebase. An embodiment presents a requirement for a new business process, or portion thereof, to the Q and A system in the forms of one or more natural language questions. The Q and A system arrives at a set of suggested process flows, activities, or changes to existing processes based on answers and supporting evidence in the knowledgebase. In one embodiment, the Q and A system further provides confidence ratings to the answers.

An embodiment allows a user, such as a BP analyst, to design the requested business process or portion thereof using the answers. Another embodiment further selects an answer, such as an answer whose confidence rating exceeds a threshold. The embodiment constructs instructions for a BPM tool based on the answers. The embodiment supplies the instructions to the BPM tool, which in-turn constructs a model for the requested business process or portion thereof in an automated manner.

The illustrative embodiments are described with respect to, certain business processes, forms of data, methodologies, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
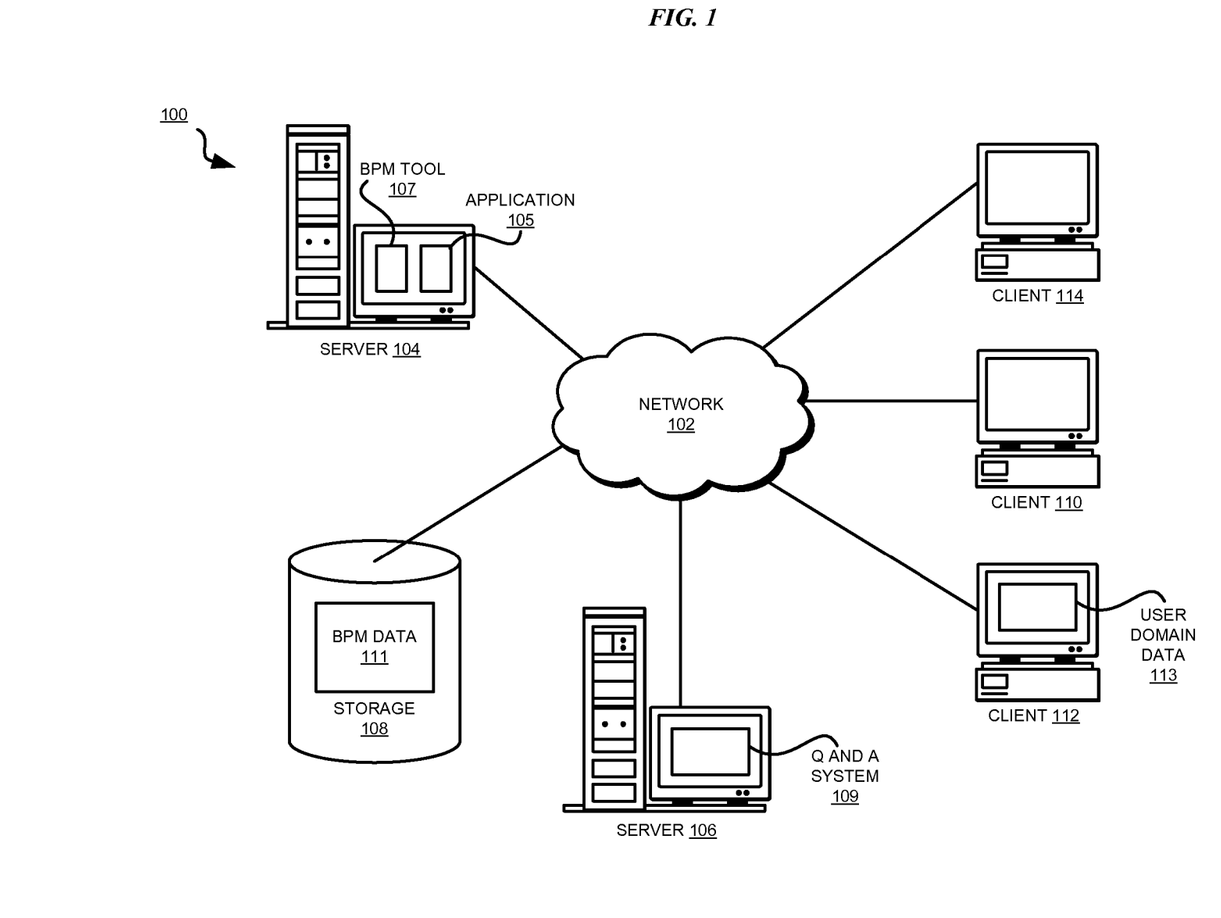
FIG. 1 depicts a pictorial representation of a network of data processing systems in which illustrative embodiments may be implemented.
Figure 2:
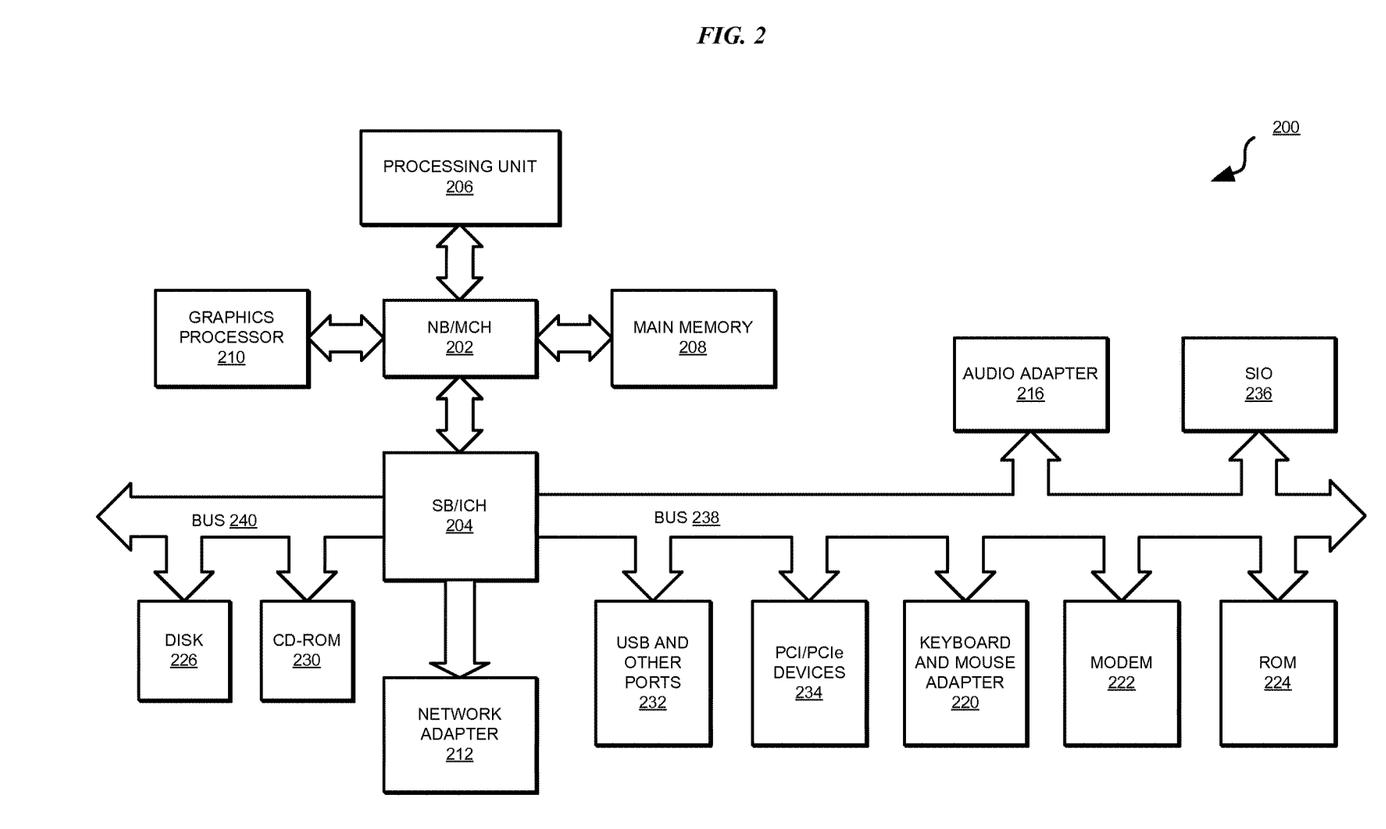
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 includes an implementation of an embodiment described herein. Application 105 operates in conjunction with BPM tool 107 and Q and A system 109 according to an embodiment. In one embodiment, application 105 comprises a modification of BPM tool 107. BPM data 111 comprises data provided by BPM tool 107, such as standard process models and documentation of process modifications or additional processes. User domain data 113 comprises organization-specific data in any available form and usable for constructing or modifying all or a part of an organization-specific business process model. BPM data 111 and user domain data 113 together form a knowledgebase. Q and A system 109 uses the knowledgebase to answer natural language questions pertaining to constructing or modifying all or a part of an organization-specific business process model.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications, logic, or programs, such as application 105, BPM tool 107, and Q and A system 109 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
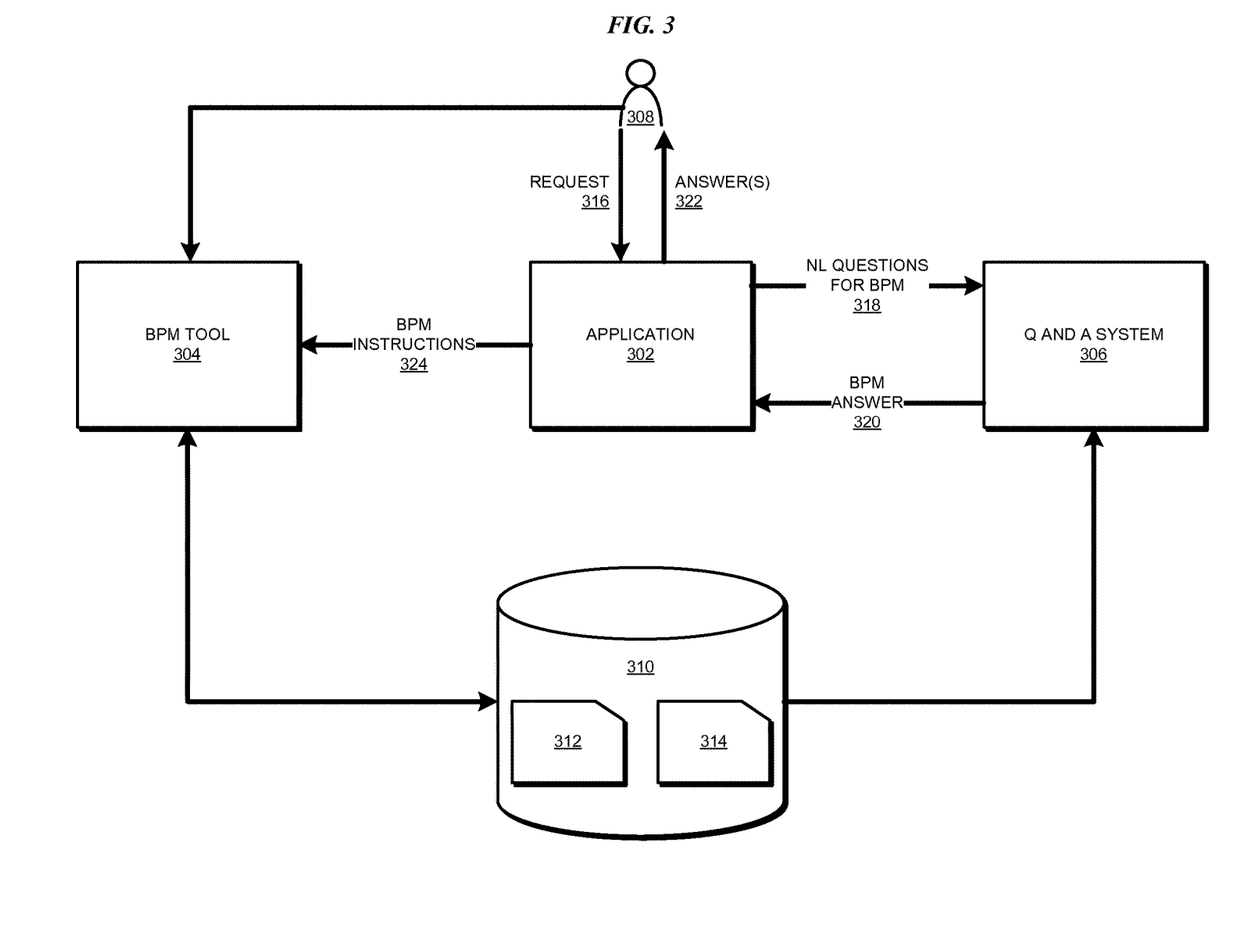
FIG. 3 depicts a block diagram of an example configuration for business process modeling using a Q and A system in accordance with an illustrative embodiment.

With reference to FIG. 3, this figure depicts a block diagram of an example configuration for business process modeling using a Q and A system in accordance with an illustrative embodiment. Application 302, BPM tool 304, and Q and A system 306 are each an example of application 105, BPM tool 107, and Q and A system 109, respectively, in FIG. 1. User 308, such as a business analyst or business process modeler, models business processes in a given organization. Knowledgebase 310 can span one or more data storage devices or repositories, and comprises BPM data 312 and user domain data 314. BPM tool 304 contributes BPM data 312. Various repositories in the operating environment of the given organization contribute user domain data 314.

User 308 makes request 316 in application 302. Request 316 specifies the business process, or a portion thereof, that is to be modeled for the organization. In one embodiment, request 316 takes the form of a requirements document. In another embodiment, request 316 takes the form of a question or components of a question, specified to application 302 in any suitable manner. For example, one embodiment accepts request 316 in the form of a spoken (audio) question in a natural language, or a natural language question entered as text. To illustrate the operation of an embodiment, consider a sample request 316—"model the order fulfillment process."

Application 302 constructs a natural language question in the BPM domain for the given operating environment of the organization. For example, application 302 constructs knowledgebase 310 by identifying, retrieving, collecting, referencing, or otherwise making available BPM data 312 and user domain data 314. Application 302 uses a natural language processing (NLP) engine to transform request 316 into one or more natural language (NL) BPM questions 318. For example, for the above example request 316, application 302 produces example NL question 318 as follows—"What steps are necessary to fulfill a customer order?" Application 302 provides knowledgebase 310 and NL questions 318 to Q and A system 306.

Figure 4:
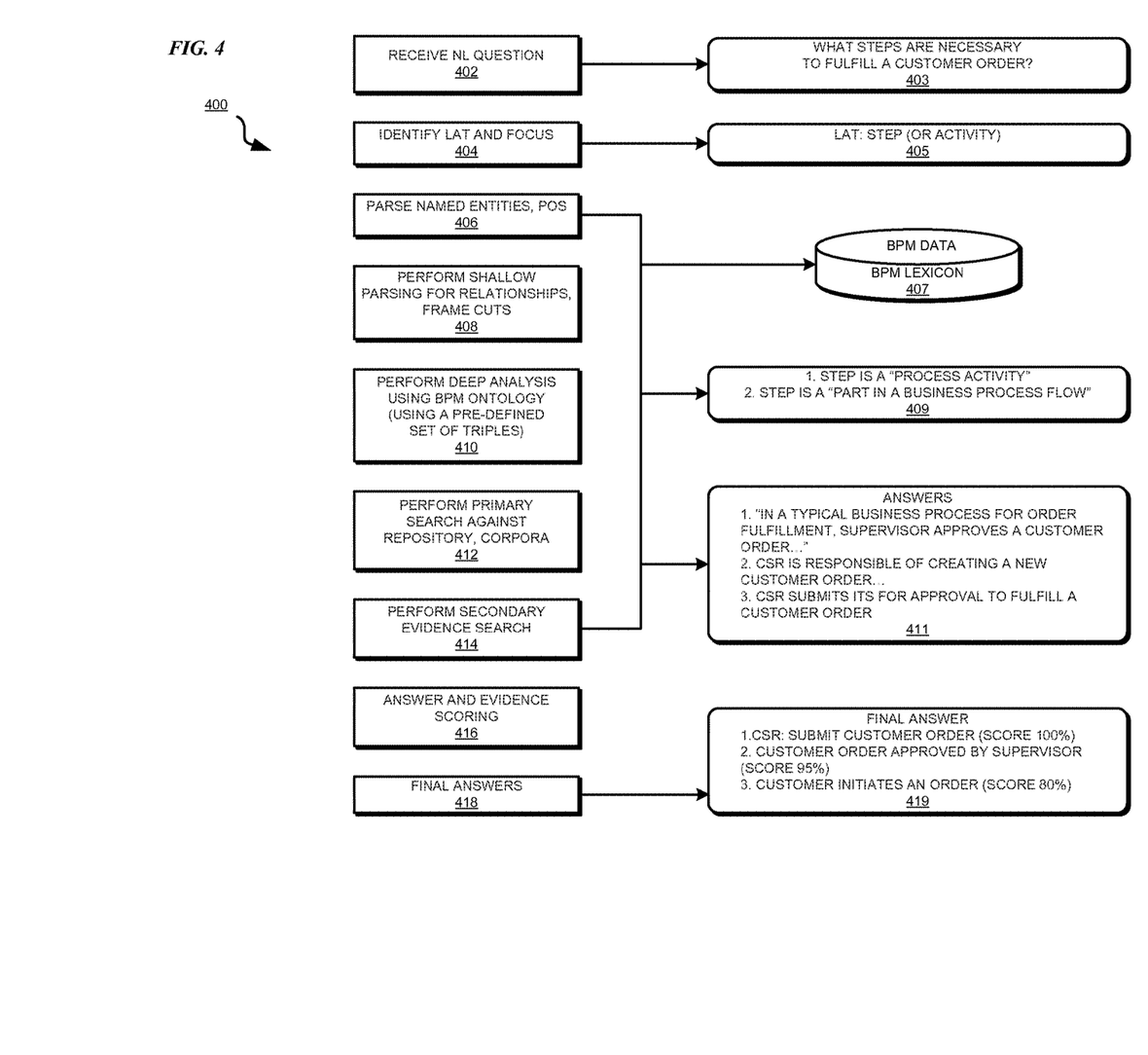
FIG. 4 depicts a block diagram of an example process of using a Q and A system to answer questions in the BPM domain in accordance with an illustrative embodiment.

Q and A system performs a process as described with respect to FIG. 4, to provide one or more answers 320 pertaining to BPM in the organization's operating environment. In one embodiment, Q and A system 306 also provides evidence from knowledgebase 310 that supports an answer in answers 320. Some examples of the evidence include, but are not limited to, an email, a policy, a system configuration, a vendor or agency procedure document, a previously implemented business process or a portion thereof, a best practices recommendation, a standard specification, or another portion of a document in BPM data 312 or user domain data 314.

In another embodiment, Q and A system 306 also provides confidence ratings with an answer in answers 320. A confidence rating is an indication of a probability than an answer is correct given the evidence in support of the answer. The confidence ratings can be expressed as a percentage or on a 0-to-1 scale, or in any other suitable manner.

In one embodiment, application 302 presents answers 320, and any accompanying evidence and/or confidence ratings, as one or more answer 322 to user 308. For example, in one embodiment, application converts answers 320 into form data to present to user as answer(s) 322. In another embodiment, application 302 presents answer(s) 322 as a graph, such as a workflow graph or a process graph. In another embodiment, where Q and A system 306 produces answers 320 in natural language form, application 302 passes NL answers 320 directly to user 308 as answers 322. User 308 can then use answers 322 to generate or modifies an organization-specific business process model or a portion thereof in a business process modeling language using BPM tool 304.

In an embodiment, application 302 converts answers 320 into instructions 324 usable by BPM tool 304. For example, in instructions 324, application 302 specifies the BP elements, and labels, relationships, dependencies, and order thereof, to BPM 304. BPM 304 uses instructions 324 to generate or modifies an organization-specific business process model or a portion thereof in a business process modeling language.

With reference to FIG. 4, this figure depicts a block diagram of an example process of using a Q and A system to answer questions in the BPM domain in accordance with an illustrative embodiment. Process 400 can be implemented in Q and A system 306 in FIG. 3.

For clarity, the operations in FIG. 4 are described using the example of request 316 of FIG. 3—model the order fulfillment process." The Q and A system receives (block 402) NL question 403. According to the example, NL question 403 is in the example form "what steps are necessary to fulfill a customer order?"

The Q and A system identifies Lexical Answer Type (LAT) and focus of question 403 (block 404). LAT is a type of answer that is of interest to the question asker. In example question 403, the question asks for steps, so LAT 405 is a "step" or "steps" of an activity.

The Q and A system then decides whether question 403 has to be parsed for identifying any specific entities that participate in the activity, or if there are any parts of speech (POS) that have to be considered in answering the question (block 406). For example, the question asks not only for steps, but also for a type of steps associated with entity "customer order" where the steps are "necessary" and operate to "fulfill" the customer order. The Q and A system can, for example, use BPM lexicon 407 available in BPM data 312 in FIG. 3, to determine the structure, details, construct, or equivalents of the entities identified in the question.

Using the entity (or BPM equivalent of the entity) in question 403, in an analytical process called shallow analysis, the Q and A system parses question 403 to form relationships by grouping the various parts of speech into frames. The Q and A system performs an analysis (deep analysis) using BPM ontology (a part of BPM data 312) to define one or more subject-predicate-object constructs known as ontology triples.

For example, the Q and A system determines that the steps asked for in question 403 have to be necessary; the steps have to be for fulfillment; the fulfillment is of a customer order (or perhaps a Purchase Order according to a given instance of BPM lexicon 407). Accordingly, the Q and A system infers relationships that the steps asked for are one or more steps in a process activity and the process activity is a part of a business process flow (block 409). The Q and A system can form many relationships called frame cuts in this manner.

Using this information, the Q and A system performs a search in the supplied knowledgebase (block 412). The search is called a primary search, and is directed to one or more supplied knowledgebases, for example, to knowledgebase 310 (also known as a corpus (singular), corpora (plural)). The primary search objective is to determine whether the knowledgebase contains information to answer questions about a process, particularly a business process, particularly a business process flow pertaining to fulfillment, and specifically pertaining to fulfilling customer order or purchase orders in this organization's operating environment. The primary search returns a set of search results.

The Q and A system can perform any number of primary searches using any number of knowledgebases in this manner. The result set includes fragments of documents from the searched knowledgebases. The Q and A system further infers relationships from the result set to identify the steps in response to question 403. The Q and A system presents the relationships-based steps in the forms of answers 411.

If the answer to question 403 has to be supported with evidence, the Q and A system has to determine which documents or document fragments support the answers in answers 411. The Q and A system performs a secondary search to identify such support (block 414). The Q and A system then reviews the collected evidence to determine a probability of correctness of an answer given the evidence (block 416). The Q and A system then produces a set of final answers, which are supported by evidence and confidence rated (block 418). Example answer to question 403 is depicted in block 419, which provides the steps believed to be necessary, with the associated degree of confidence, for fulfilling a customer order in the given operating environment of the organization.

Note that the specific operation of the Q and A system is described only as an example to describe how an embodiment leverages the capabilities of an example Q and A system to assist with business process modeling. The specific operations of the example Q and A system are not intended to be limiting on the illustrative embodiments. From this disclosure, those of ordinary skill in the art will be able to conceive other ways of using other Q and A systems for a similar purpose, and the same are contemplated within the scope of the illustrative embodiments.

Figure 5:
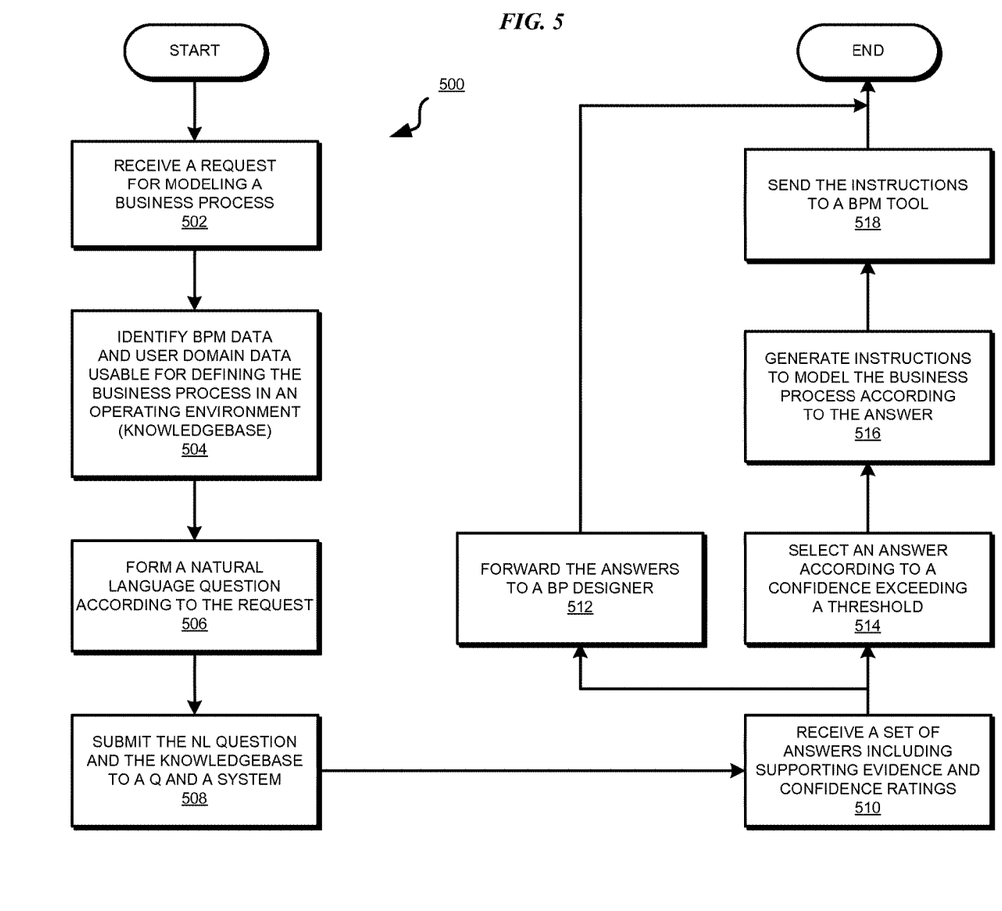
FIG. 5 depicts a flowchart of an example process for business process modeling using a Q and A system in accordance with an illustrative embodiment.

With reference to FIG. 5, this figure depicts a flowchart of an example process for business process modeling using a Q and A system in accordance with an illustrative embodiment. Process 500 can be implemented in application 302 in FIG. 3.

The application receives a request for modeling a business process (block 502). The request may be for modeling a new business process or a portion thereof, or for modifying an existing business process or a portion thereof.

The application identifies BPM data and user domain data usable for defining the business process in a given operating environment of an organization (block 504). The identified documents collectively form a knowledgebase for a Q and A system.

The application forms a natural language question according to the request (block 506). The application may form more than one NL questions in block 506 within the scope of the illustrative embodiments.

The application submits the NL question and the knowledgebase to a Q and A system (block 508). The application receives a set of answers from the Q and A system (block 510). In one embodiment, the application further receives supporting evidence and confidence ratings for an answer in the set of answers.

Under certain circumstances, the application forwards the answers to a user, such as to a BP designer (block 512). The application ends process 500 thereafter.

Under other circumstances, the application selects an answer from the set of answers according to a confidence rating of the answer exceeding a threshold (block 514). The application generates instructions for modeling the business process according to the selected answer (block 516). The application sends the instructions to a BPM tool (block 518). The application ends process 500 thereafter.

In one embodiment, the application allows a user to approve, reject of revise (not shown) the answer selected at block 514. An embodiment can be configured to further allow the application to select an answer even if a confidence rating of the answer does not exceed a threshold, such as when a user expressly directs the application to select such an answer. In another embodiment, the application allows a user to approve, reject of revise (not shown) the instructions generated at block 516.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for business process modeling using a Q and A system. An embodiment automates the BPM process. The embodiment integrates available the unstructured and structured data from various sources in various forms into a knowledgebase. The embodiment presents NL questions pertaining to modeling a business process and obtains answers to those NL questions from a Q and A system.

An embodiment is usable for providing assistance during process modeling by recommending the next steps for process flows or data flows in an organization. An embodiment is also usable for validating an existing business model. An embodiment is also usable for suggesting changes or improvements, or to provide recommendations that best suit a specific task in view of an organization's policies and requirements. An embodiment is also useful for imposing consistency amongst different implementations and implementers of business process models.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for creating a business process model using a question and answer (Q and A) system, the method comprising:
   modifying, by an application executing in one or more processors, a business process modeling (BPM) tool, wherein the BPM tool comprises a software application that is configured to produce a model output in a specific modeling language using a set of standard process models, a modification comprising enabling the BPM tool to produce the business process model using new instructions corresponding to natural language answers from the Q and A system, the new instructions being distinct from the standard process models, the modification comprising:
   receiving a request to create the business process model of a business process;
   converting, by the application executing in the one or more processors, a document in user domain data into a natural language (NL) document, wherein the user domain data comprises a combination of unstructured documents and structured documents related to an operation in a user domain;
   constructing, by the application executing in the one or more processors, a knowledgebase by adding the NL document in an ontology representation of the knowledgebase, and by adding to the ontology a business process modeling (BPM) data;
   detecting, by the application executing in the one or more processors, a set of relationships, descriptions, labels, and process elements from the knowledgebase;
   transforming, by the application executing in the one or more processors, the request into an NL question;
   parsing, in the Q and A system using the BPM data, the NL question into an ontology-triple of entities participating in an activity in the NL question;
   forming, by the application executing in the one or more processors, a set of frame cuts, each frame cut comprising a relationship of entities in a step of the activity;
   computing a set of answers from the Q and A system responsive to the NL question, an answer in the set of answers identifying a portion of the knowledgebase where a relationship of entities is found;
   receiving, associated with each answer in the set of answers, a set of evidence from the knowledgebase, wherein a first set of evidence associated with a first answer in the set of answers supports the first answer;
   receiving, associated with each answer in the set of answers, a confidence rating, wherein a first confidence rating associated with the first answer indicates a probability that the first answer is correct in view of the first set of evidence for modeling the business process;
   selecting, by the application executing in the one or more processors, the answer from the set of answers using a confidence rating associated with the answer, wherein the confidence rating exceeds a threshold level of confidence;
   constructing, by the application executing in the one or more processors, a set of instructions using the answer, the set of instructions being a part of the new instructions; and
   sending the set of instructions to a BPM tool, wherein the set of instructions are executable by the BPM tool to automate a construction of the model.

2. The method of claim 1, further comprising:
   identifying a first component, a second component, and a relationship between the first and the second components in a business process flow; enabling, responsive to the identifying, a user to construct the business process model.

3. The method of claim 1, wherein the BPM tool provides the BPM data, and wherein the unstructured data comprises an email communication.

4. The method of claim 1,
   wherein the NL document is usable for answering a natural language question pertaining to BPM subject matter domain.

5. The method of claim 1, wherein the request is in a form other than natural language statement.

6. The method of claim 1, wherein the business process is a part of a second business process.

7. The method of claim 1, wherein the request to create the business process model comprises a request to validate a business process.

8. The method of claim 1, wherein the request to create the business process model comprises a request to modify an existing business process.

9. A non-transitory computer usable program product comprising a computer usable storage device including computer usable code for creating a business process model using a question and answer (Q and A) system, the computer usable code comprising:

computer usable code for modifying, by an application executing in one or more processors, a business process modeling (BPM) tool, wherein the BPM tool comprises a software application that is configured to produce a model output in a specific modeling language using a set of standard process models, a modification comprising enabling the BPM tool to produce the business process model using new instructions corresponding to natural language answers from the Q and A system, the new instructions being distinct from the standard process models, the modification comprising:

computer usable code for receiving a request to create the business process model of a business process;

computer usable code for converting, by the application executing in the one or more processors, a document in user domain data into a natural language (NL) document, wherein the user domain data comprises a combination of unstructured documents and structured documents related to an operation in a user domain;

computer usable code for constructing, by the application executing in the one or more processors, a knowledgebase by adding the NL document in an ontology representation of the knowledgebase, and by adding to the ontology a business process modeling (BPM) data;

computer usable code for detecting, by the application executing in the one or more processors, a set of relationships, descriptions, labels, and process elements from the knowledgebase;

computer usable code for transforming, by the application executing in the one or more processors, the request into an NL question;

computer usable code for parsing, in the Q and A system using the BPM data, the NL question into an ontology-triple of entities participating in an activity in the NL question;

computer usable code for forming, by the application executing in the one or more processors, a set of frame cuts, each frame cut comprising a relationship of entities in a step of the activity;

computer usable code for computing a set of answers from the Q and A system responsive to the NL question, an answer in the set of answers identifying a portion of the knowledgebase where a relationship of entities is found;

computer usable code for receiving, associated with each answer in the set of answers, a set of evidence from the knowledgebase, wherein a first set of evidence associated with a first answer in the set of answers supports the first answer;

computer usable code for receiving, associated with each answer in the set of answers, a confidence rating, wherein a first confidence rating associated with the first answer indicates a probability that the first answer is correct in view of the first set of evidence for modeling the business process;

computer usable code for selecting, by the application executing in the one or more processors, the answer from the set of answers using a confidence rating associated with the answer, wherein the confidence rating exceeds a threshold level of confidence;

computer usable code for constructing, by the application executing in the one or more processors, a set of instructions using the answer, the set of instructions being a part of the new instructions; and     computer usable code for sending the set of instructions to a BPM tool, wherein the set of instructions are executable by the BPM tool to automate a construction of the model.

10. The computer usable program product of claim 9, further comprising:

computer usable code for identifying a first component, a second component, and a relationship between the first and the second components in a business process flow; enabling, responsive to the identifying, a user to construct the business process model.

11. The computer usable program product of claim 9, wherein the BPM tool provides the BPM data, and wherein the unstructured data comprises an email communication.

12. The computer usable program product of claim 9, wherein the computer usable code is stored in a computer readable storage medium in a data processing system, and wherein the computer usable code is transferred over a network from a remote data processing system.

13. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

14. A data processing system for creating a business process model using a question and answer (Q and A) system, the data processing system comprising:

a storage device including a storage medium, wherein the storage device stores computer usable program code; and     a processor, wherein the processor executes the computer usable program code, and wherein the computer usable program code comprises:

computer usable code for modifying, by an application, a business process modeling (BPM) tool, wherein the BPM tool comprises a software application that is configured to produce a model output in a specific modeling language using a set of standard process models, a modification comprising enabling the BPM tool to produce the business process model using new instructions corresponding to natural language answers from the Q and A system, the new instructions being distinct from the standard process models, the modification comprising:

computer usable code for receiving a request to create the business process model of a business process;

computer usable code for converting, by the application, a document in user domain data into a natural language (NL) document, wherein the user domain data comprises a combination of unstructured documents and structured documents related to an operation in a user domain;

computer usable code for constructing, by the application, a knowledgebase by adding the NL document in an ontology representation of the knowledgebase, and by adding to the ontology a business process modeling (BPM) data;

computer usable code for detecting, by the application, a set of relationships, descriptions, labels, and process elements from the knowledgebase;

computer usable code for transforming, by the application, the request into an NL question;

computer usable code for parsing, in the Q and A system using the BPM data, the NL question into an ontology-triple of entities participating in an activity in the NL question;

computer usable code for forming, by the application, a set of frame cuts, each frame cut comprising a relationship of entities in a step of the activity;

computer usable code for computing a set of answers from the Q and A system responsive to the NL question, an answer in the set of answers identifying a portion of the knowledgebase where a relationship of entities is found;

computer usable code for receiving, associated with each answer in the set of answers, a set of evidence from the knowledgebase, wherein a first set of evidence associated with a first answer in the set of answers supports the first answer;

computer usable code for receiving, associated with each answer in the set of answers, a confidence rating, wherein a first confidence rating associated with the first answer indicates a probability that the first answer is correct in view of the first set of evidence for modeling the business process;

computer usable code for selecting, by the application, the answer from the set of answers using a confidence rating associated with the answer, wherein the confidence rating exceeds a threshold level of confidence;

computer usable code for constructing, by the application, a set of instructions using the answer, the set of instructions being a part of the new instructions; and computer usable code for sending the set of instructions to a BPM tool, wherein the set of instructions are executable by the BPM tool to automate a construction of the model.

* * * * *